(No Model.)

J. T. WILSON.
CORN SHELLER.

No. 284,991. Patented Sept. 11, 1883.

WITNESSES:
Thos. Houghton.
W. X. Sivens.

INVENTOR:
Jno. Thos. Wilson
BY Munn & Co
ATTORNEYS.

N. PETERS, Photo-Lithographer, Washington, D. C.

UNITED STATES PATENT OFFICE.

JOHN THOMAS WILSON, OF EASTON, MISSOURI.

CORN-SHELLER.

SPECIFICATION forming part of Letters Patent No. 284,991, dated September 11, 1883.

Application filed June 6, 1883. (No model.)

*To all whom it may concern:*

Be it known that I, JOHN THOMAS WILSON, a citizen of the United States, residing at Easton, in the county of Buchanan and State of Missouri, have invented a new and useful Improvement in Corn-Shellers, of which the following is a specification.

The object of my invention is to produce a corn-sheller which will receive the ears of corn when thrown into its hopper promiscuously with a scoop, will shell the corn from the cob, and separate the cobs from the shelled corn.

To this end my invention consists in the construction and combination of parts hereinafter described and claimed, reference being had to the accompanying drawings, in which—

Figure 1:
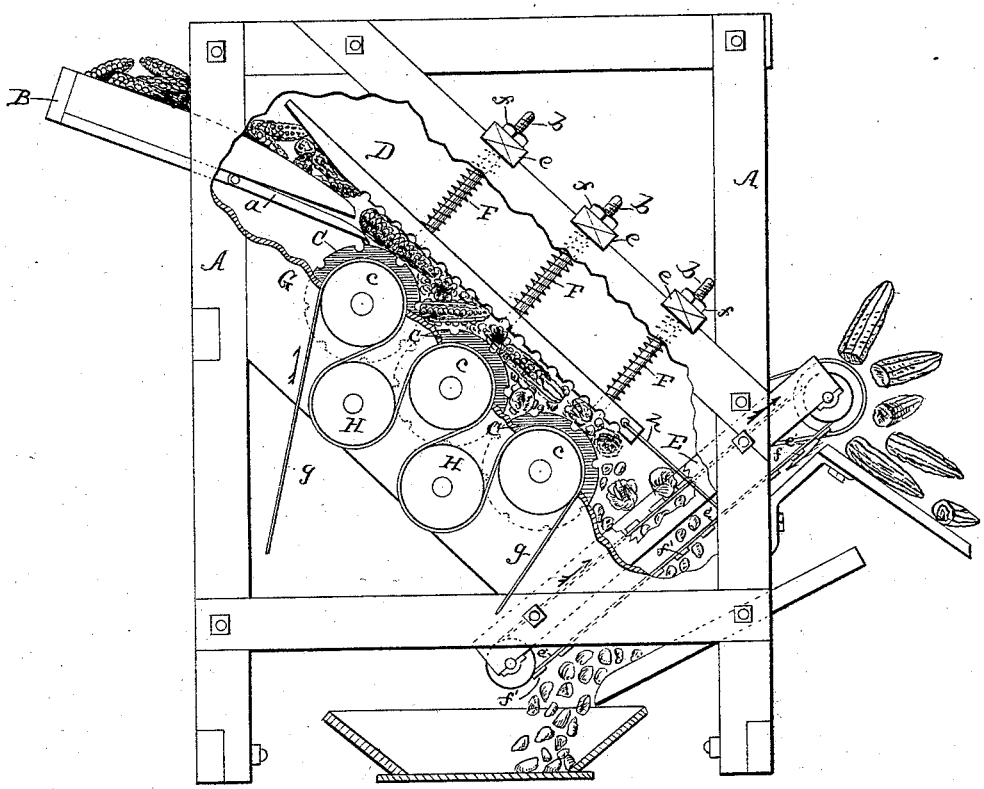
Figure 2:
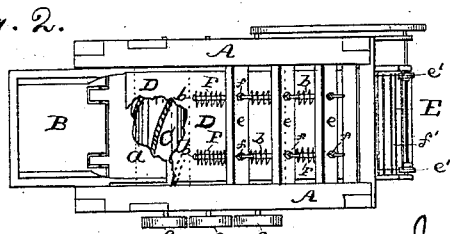

Figure 1 is a side elevation of my corn-sheller, a portion of the side broken away to show the interior; and Fig. 2 is a top view of the same.

A represents the frame of the machine.

B is the hopper, into which the ears of corn are thrown with a scoop, shovel, or otherwise, without regard to their direction.

C represents rotary cylinders, by whose action the corn, passing between them and the presser-plate D, is shelled, the cobs and shelled corn falling together on the separator E, the corn passing through the separator and the cobs being carried off thereby. A portion, $a$, of the bottom of the hopper is pivoted to swing a little vertically, its lower end resting on the upper cylinder, C. Each cylinder is spirally corrugated when made wholly of iron, or, if made of wood, it is provided with spiral staves, and the under side of plate D is corrugated or otherwise roughened to act on the corn to shell it. The pivoted bottom $a$ is shaken by the corrugations of the cylinder on which its lower end rests, thus assisting the ears of corn to work into the sheller. The upper end of plate D is scarfed off on its under side to give the mill-mouth a hopper shape. $b$ represents a number of studs secured in the back of plate D, and extending up through cross-pieces $e$ of the frame, and provided with screws and nuts $f$ at their upper ends to rest on the cross-pieces $e$, to prevent the plate D from approaching the cylinders C within a given limit, this limit being made adjustable by said screws.

F represents springs around studs $b$, acting between cross-pieces $e$ and the plate D to hold the latter down with elastic pressure. The cylinders C are journaled in bearings in bracing-timbers G of the frame. Each cylinder has a pulley, $c$, on its shaft. These pulleys are all of one size, and are run by one belt, $g$.

H H are intermediate pulleys, used to guide the belt well around each of the pulleys $c$. The separator E may be of any usual form for that purpose. As here shown, it consists of an apron formed of two belts, $e$ $e$, having slats $f'$ secured to them near enough together to stop cobs, yet enough apart to allow corn to drop through between them. This apron rotates in a direction to carry the cobs out of the mill. The cylinders C are near enough together to prevent the passage of cobs between them. The plate D is held firmly against longitudinal strain by braces $h$, which are pivoted at one end to it and at the other end to the main frame. By this means the plate is permitted motion in the direction of its studs $b$, but is held firmly against longitudinal strain from the thrust of the cylinders in shelling corn.

What I claim as my invention, and wish to secure by Letters Patent, is—

1. The combination, with the roughened cylinders C and roughened plate D, of the hopper B, having a portion, $a$, of its bottom pivoted to swing vertically, the lower end of said portion $a$ being supported on one of the cylinders C to be shaken thereby, as shown and described.

2. The combination, with the frame A, the roughened cylinders C, and the roughened plate D, of the studs $b$, secured at their lower ends in said plate, their upper ends passing freely through supports, the cross-pieces $e$, serving as such supports, the springs F, acting between said plate and supports, and the braces $h$, pivoted at one end to said plate and at the other end to the said frame, as shown and described.

JOHN THOMAS WILSON.

Witnesses:
 HENRY FRIEDE,
 J. G. SCHNEIDER.